United States Patent
Koju et al.

(10) Patent No.: US 11,886,848 B2
(45) Date of Patent: Jan. 30, 2024

(54) BINARY TRANSLATION USING RAW BINARY CODE WITH COMPILER PRODUCED METADATA

(71) Applicant: INTERNATIONAL BUSINESS MACHINES CORPORATION, Armonk, NY (US)

(72) Inventors: Toshihiko Koju, Chiba (JP); Reid Copeland, Ontario (CA); David Kevin Siegwart, Eastleigh (GB); Jordan Ryan Zannier, Scarborough (CA); Allan H. Kielstra, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 17/664,969

(22) Filed: May 25, 2022

(65) Prior Publication Data
US 2023/0385041 A1     Nov. 30, 2023

(51) Int. Cl.
*G06F 8/41*     (2018.01)

(52) U.S. Cl.
CPC ............. *G06F 8/443* (2013.01); *G06F 8/447* (2013.01)

(58) Field of Classification Search
USPC ........................................................ 717/136
See application file for complete search history.

(56) References Cited

U.S. PATENT DOCUMENTS

| | | | | |
|---|---|---|---|---|
| 5,355,492 A | * | 10/1994 | Frankel | G06F 8/427 717/149 |
| 10,776,255 B1 | | 9/2020 | Ireland | |
| 2007/0079304 A1 | * | 4/2007 | Zheng | G06F 9/45516 717/151 |

(Continued)

OTHER PUBLICATIONS

Altinay et al., "BinRec: Dynamic Binary Lifting and Recompilation," ACM, 2020, 16pg. (Year: 2020).*

(Continued)

*Primary Examiner* — Ryan D. Coyer
(74) *Attorney, Agent, or Firm* — Douglas M. Crockatt

(57) ABSTRACT

A method, system, and computer-readable medium for binary translation cause a binary translator to combine raw binary code and compiler-produced metadata associated with a compiled program module. The binary translator is caused to further reconcile, using the compiler-produced metadata, original compiler-produced control flow information with how lower-level machine instructions comprise a control flow in the raw binary code, and original compiler-produced aliasing information with how lower-level machine instructions access the memory locations described by the aliasing information according to predetermined criteria. The binary translator further caused to prevent, copy propagation of values in temporary variables for decimal computations beyond offsets in the machine instructions where the temporary variables are killed. The binary translator further caused to remove identified dead store instructions, and to generate a new compiled program module (Continued)

comprising an optimized version of the compiled program module having strict compatibility to an original version of the compiled program module.

20 Claims, 8 Drawing Sheets

(56) References Cited

U.S. PATENT DOCUMENTS

| | | | | |
|---|---|---|---|---|
| 2012/0151437 A1* | 6/2012 | Kneisel | ............ | G06F 8/51 |
| | | | | 717/137 |
| 2014/0317608 A1* | 10/2014 | Koju | ............ | G06F 8/443 |
| | | | | 717/151 |
| 2018/0143812 A1 | 5/2018 | Copeland | | |
| 2019/0180037 A1 | 6/2019 | Jones | | |
| 2020/0183669 A1 | 6/2020 | Mola | | |

OTHER PUBLICATIONS

Duck et al., "Binary Rewriting without Control Flow Recovery," ACM, 2020, 13pg. (Year: 2020).*

Smithson et al., "Binary Rewriting without Relocation Information," Univ. of Maryland, 2010, 11pg. (Year: 2010).*

Jingu, et al., "Directive-Based Parallelization of For-Loops at LLVM IR Level," SNPD 2019, Jul. 8-11, 2019, Toyama, Japan, IEEE, pp. 421-426, <https://www.computer.org/csdl/pds/api/csdl/proceedings/download-article/1fThfgHOlow/pdf?casa_token=0PLGh7EzB68AAAAA:0jwyQf5a9M84HRRbKV0W6MABSqZtNwuQdluHsOQXxbNRsmQ3II8jNZAaEP8j_5KV-JwcCGf7aCU>.

Koju, et al., "Re-constructing High-Level Information for Language-Specific Binary Re-optimization," CGO '16, Mar. 12-18, 2016, Barcelona, Spain, ACM, pp. 273-283, <https://dl.acm.org/doi/pdf/10.1145/2854038.2854057?casa_token=fABq1QygS80AAAAA:wVVocOkrSKdy7IEGdtlhOsIIJ3AQyRHMUCvxEZyxiA-ytE9mDtNaZznbhz7rD5ZEfgEVF09Kp6azPg>.

* cited by examiner

BINARY TRANSLATION USING RAW BINARY CODE WITH COMPILER PRODUCED METADATA

FIELD

The present disclosure relates generally to field of data processing, and more particularly to recompilation of existing source programs, build compiler migration, and binary translation or binary optimization of compiled programs in a data processing environment.

BACKGROUND

Both recompilation and build compiler migration are typically challenging for customers because when recompiling the source, any errors in input data or source code handling of the data may result in different runtime behavior in the application. This different runtime behavior in the application typically requires significant development and testing efforts to correct the data and to migrate the source and the data to a newer compiler.

SUMMARY

According to one or more embodiments of the present disclosure, a computer-implemented method for binary translation, combines, by a binary translator, raw binary code and compiler-produced metadata associated with a compiled program module. The binary translator using the compiler-produced metadata, reconciles original compiler-produced control flow information with how lower-level machine instructions comprise a control flow in the raw binary code. The binary translator, using the compiler-produced metadata, further reconciles original compiler-produced aliasing information with how lower-level machine instructions access the memory locations described by the aliasing information according to predetermined criteria. The binary translator, using the compiler-produced metadata, further prevents copy propagation of values in temporary variables for decimal computations beyond offsets in the machine instructions where the temporary variables are killed. The computer-implemented method further includes removing, by the binary translator using the compiler-produced metadata, of identified dead store instructions. The computer-implemented method still further causes generating, by the binary translator, of a new compiled program module in a form of an optimized version of the compiled program module having strict compatibility to an original version of the compiled program module.

According to one or more embodiments, a computer-implemented method for binary translation, causes a binary translator to receive as input an original compiler-produced module comprising raw binary code that does not have binary metadata and to further receive as input by the binary translator a separate compiler-produced metadata in one of a binary form and a text form. The computer-implemented method further causes combining, by the binary translator, the raw binary code and the compiler-produced metadata in at least one of a physical form and a logical form. The computer-implemented method causes reconciling, by the binary translator using the compiler-produced metadata, original compiler-produced control flow information with how lower-level machine instructions comprise a control flow in the raw binary code. The computer-implemented method further includes reconciling, by the binary translator using the compiler-produced metadata, original compiler-produced aliasing information with how lower-level machine instructions access the memory locations described by the aliasing information according to predetermined criteria. The computer-implemented method further includes preventing, by the binary translator using the compiler-produced metadata, copy propagation of values in temporary variables for decimal computations beyond offsets in the machine instructions where the temporary variables are killed. The computer-implemented method further includes removing, by the binary translator using the compiler-produced metadata, identified dead store instructions. The computer-implemented method also includes generating, by the binary translator, of a new compiled program module in a form of an optimized version of the compiled program module having strict compatibility to an original version of the compiled program module.

According to one or more embodiments, a computer-implemented method for binary translation, causes receiving as input by a binary translator an original compiler-produced module comprising raw binary code that does not have binary metadata. The computer-implemented method also causes receiving further input by the binary translator from a repository comprising high level program information corresponding to the original compiler-produced module in compiler-produced metadata information including instruction offset, and reference to storage. The computer-implemented method further includes combining, by the binary translator, the raw binary code and the compiler-produced metadata in at least one of a logical form and a physical form. The computer-implemented method providing a capability of reconciling, by the binary translator using the compiler-produced metadata, original compiler-produced control flow information with how lower-level machine instructions comprise a control flow in the raw binary code. The computer-implemented method further providing a capability of reconciling, by the binary translator using the compiler-produced metadata, original compiler-produced aliasing information with how lower-level machine instructions access the memory locations described by the aliasing information according to predetermined criteria. The computer-implemented method still further providing a capability of preventing, by the binary translator using the compiler-produced metadata, copy propagation of values in temporary variables for decimal computations beyond offsets in the machine instructions where the temporary variables are killed. The computer-implemented method also providing a capability of removing, by the binary translator using the compiler-produced metadata, identified dead store instructions. The computer-implemented method further includes generating, by the binary translator, of a new compiled program module in a form of an optimized version of the compiled program module having strict compatibility to an original version of the compiled program module.

According to one or more embodiments, a computer-implemented method for binary translation causes combining raw binary code and compiler-produced metadata, in response to receiving original compiler-produced control flow information including descriptive binary data comprising basic blocks in an original intermediate representation (IR), with start and end original machine instruction offsets corresponding to each respective block, edges between these basic blocks in the original IR, out-of-line basic blocks for late created control flow, and information available to the original compiler on calls which never return, further reconciling the original compiler-produced control flow information with how lower level machine instructions make up a control flow in raw binary code by: creating, by a binary translator using the descriptive binary data from original compiler-produced modules, progressively splitting basic blocks to be used during optimization and code generation phases of the binary translator.

The progressively splitting further comprising, splitting machine instructions using information about the basic blocks in the original IR and out-of-line basic blocks in the descriptive binary data; splitting the machine instructions further by analyzing branch instructions in the raw binary code in each IR-based basic block; and splitting the machine instructions further at calls which never return as determined from the descriptive binary data; and creating, by the binary translator control-flow edges between the basic blocks by: analyzing targets of direct branch instructions in the raw binary code, and adding edges in the IR of the binary translator using the descriptive binary data for targets of indirect branch instructions.

The computer-implemented method, in response to receiving the descriptive binary data further comprising aliasing information as it applies to the original IR and information including annotation/tracking of each original machine instruction that references memory, includes creating by the binary translator, aliasing information for memory references by combining analysis of the machine instructions in the raw binary code with original aliasing information in the descriptive binary data.

The computer-implemented method, in response to a determination a memory reference on an original machine instruction being processed by the binary translator is at least one of same as, and a part of, a reference in the aliasing information of the descriptive binary based on the original IR, further includes duplicating aliasing information in an alias graph of the descriptive binary data for a corresponding reference in the IR. The computer-implemented method, in response to a determination a memory reference consists of multiple references that are present in the aliasing information of the descriptive binary data, further includes computing a union of aliases of all references in the aliasing information of the descriptive binary data corresponding to this single memory location. The computer-implemented method, in response to a determination the memory reference does not have a corresponding reference in the IR, further includes creating the aliasing information that the memory reference is aliased with all other memory references, refined later by analyzing at least one of a data area and an offset of the memory reference in the raw binary code and comparing with other references in the aliasing information of the descriptive binary data. The computer-implemented method, in response to receiving the descriptive binary data further comprising offsets of the machine instructions where temporary variables for decimal computations are killed, further includes preventing, by the binary translator, copy propagation of values in the temporary variables for decimal computations beyond the offsets in the machine instructions where the temporary variables are killed.

The computer-implemented method further includes eliminating, by the binary translator, computations, and stores to memory of values in a middle of the decimal computations when the temporary variables to which the values are stored are killed after the decimal computations. The computer-implemented method still further includes generating, by the binary translator, of a new compiled program module in a form of an optimized version of the compiled program module having strict compatibility to an original version of the compiled program module.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
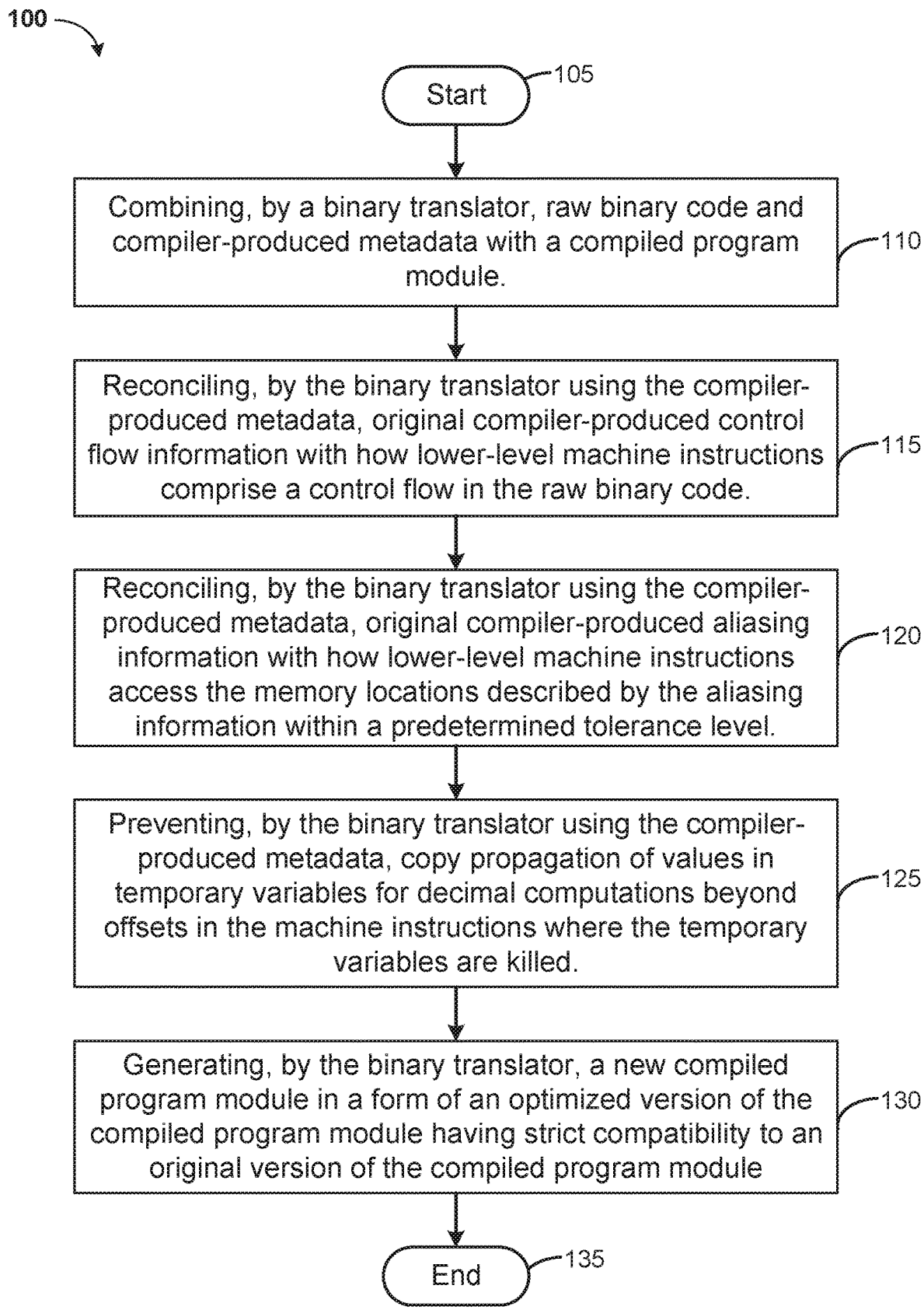
FIG. 1 is a flow diagram of an overview of a binary translation process for a compiled program module in one or more embodiments of the disclosure.

The description, which follows, and the embodiments described therein, is provided by way of illustration of an example, or examples, of particular embodiments of the principles of the present disclosure. These examples are provided for the purposes of explanation, and not limitation, of those principles and of the disclosure. In the description, which follows, like parts are marked throughout the specification and the drawings with the same respective reference numerals.

The following detailed description of the embodiments of the present disclosure does not limit the implementation to any particular data processing system programming language. Aspects of the present disclosure may be implemented in any data processing system programming language provided that the Operating System (OS) provides the facilities that may support the requirements of the embodiments disclosed herein. Any limitations presented may be quite likely a result of a particular type of OS, data processing system programming language, or data processing system and may not be a limitation of the embodiments disclosed herein.

Aspects of the present disclosure may be a system, a method, and/or a computer program product at any possible technical detail level of integration. The computer program product may include a non-transitory computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations disclosed herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments disclosed herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the following examples of the disclosure a particular binary optimizer implementation in the form of IBM® Automatic Binary Optimizer for z/OS® or ABO for short, is used by way of explanation only and is not intended as a limitation of, or to, a specific technology or product (IBM and z/OS are registered trademarks of International Business Machines Incorporated in the United States, other countries, or both). The ABO referenced in examples of the disclosure is a binary translator, or equivalently a binary optimizer, having a capability to receive already compiled executable programs and to re-optimize the compiled programs received to target newer versions of particular hardware for improved performance without a need for source recompilation or build compiler migration. The need for source recompilation or build compiler migration is typically viewed by users as pain points for upgrading or modernizing old production code. Other terms than the above binary optimizer, and binary translator may also be used equivalently including binary recompiler, decompiler, disassembler, dynamic recompiler and transcompiler to represent a collection of tools or applications having similar capabilities. In the following examples, the binary translator has a capability to receive executable binary files and associated descriptive binary data as input, analyze respective structure and descriptive information, apply transformations and optimizations, and output new optimized executable binaries. Examples in the following sections of the disclosure reflect this direction of workflow however, one skilled in the art would reasonably conclude a reverse process workflow may also be used using techniques of this disclosure with appropriate tooling.

Furthermore, a high-level language in the form of a common business-oriented language (COBOL) is used in examples of the disclosure, but the techniques disclosed are applicable to other programming languages as well, therefore, the examples are illustrative and not to be construed as limiting to a particular implementation of given examples. Both recompilation and build compiler migration are challenging for customers because when recompiling the source, any errors in input data or the source code handling of the erroneous data could result in different runtime behavior in the application. For example, the different runtime behavior typically requires significant development and testing effort to correct the data and migrate the source and the data to a newer version or release of the COBOL compiler. These so-called bad data errors, that are typically common, are a result of undefined behavior that can occur when particular sequences of compiler generated code interacts with invalid data.

Given a lack of regular recompilation and hesitancy to regularly update build compilers by many COBOL customers, this undefined behavior became, over time, the expected behavior. When recompiling from source with a new version of a compiler, or when changing compiler options including OPTIMIZE or ARCH, the new compiler generated code may produce different and unexpected behavior when the data that is processed by the program at runtime is not correctly formed.

A binary optimizer, for example the ABO of these examples, however, improves performance of the application without changing the runtime behavior of these applications that process invalid data. The difference in using the ABO is that when optimizing using the binary code as input, instead of the source, the exact runtime behavior of the program, regardless of errors in the source or data can be preserved. This is possible with a binary translator, such as the ABO, because the input to the binary optimizer is the original compiler generated code. As a result, the exact behavior, even when faced with invalid data, is unambiguously known, and can be preserved.

Therefore, starting from the original "raw" binary code provides the significant advantage of enabling strict functional and exception compatibility in the binary translated program compared to the original compiled program. However, it is challenging for binary translators to achieve good performance that is comparable to the source code re-compilation by the newer state-of-the-art compilers. These newer compilers themselves have applied advanced optimization techniques and deep hardware exploitation that make effective and strictly compatible optimization from the raw binary code alone very challenging. Specifically, this is because key information about the original source code, such as the control-flow graph, aliasing information, and variable "kill" points (where the compiler knows some variables are no longer needed) are not available in the raw binary code.

While existing binary translators, for example, ABO do perform detailed analysis of the raw binary code to discover, or infer, some of this key information, the effectiveness of this particular approach can be limited. This is especially true for complex binary code generated by state-of-the-art compilers that perform advanced optimizations and hardware exploitation. For these types of inputs to a binary translator it is typically not possible to fully analyze enough of the control flow, aliasing relationships and live ranges of variables of the raw binary code to make performance improvements from binary translation very effective.

Prior solutions have embedded complete higher-level source or a reasonably close-to-source derived intermediate language in a binary and then typically relied on this data alone for later compilation and/or optimization. While these prior solutions enable the generation of high-performance optimized programs it typically does not solve a critical issue of compatibility in the presence of data and code errors that are so common in real world COBOL programs. These compatibility errors, or a possibility of these errors would typically require a user to perform extensive and expensive testing to validate the safety of the generated "binary" optimization. Furthermore, resolving any issues typically required source, options, and environment changes to compensate for the data/code errors. Therefore, any advantages of this type of "binary" optimization in the prior solutions typically became minimal compared to a full, and very costly and time consuming, compiler migration project with a full source recompilation.

Embodiments of the disclosure provide a capability to combine analysis of the raw binary code along with specific compiler provided metadata to typically achieve both strict compatibility and high performing binary translated programs. Regarding the IBM COBOL compiler and ABO implementations, as used in examples in this disclosure, this compiler metadata is embedded in the module itself (along with the raw binary code and other parts of the program). These embodiments, however, are not merely the insertion of metadata to aid later optimization during a binary translation. Instead, the embodiments focus on inserting in the program module or logically associating compiler metadata with the program module and using specific types of metadata and how these types of metadata are combined with analysis of the raw binary code to achieve both compatible and high performing binary translated code. By way of further examples, other embodiments can implement saving the metadata, associated with the raw binary code and other portions of a program, in other locations including a separate file, a database and a cloud structure.

With reference now to FIG. 1 is a flow diagram of an overview of a binary translation process for a compiled program module in one or more embodiments of the disclosure. The binary translation may also be referred to as a binary optimization of the compiled program module. Process 100 is a computer-implemented process for binary translation, in one or more embodiments of the disclosure.

Process 100 begins (step 105) by combining, by a binary translator, raw binary code and compiler-produced metadata associated with a compiled program module (step 110).

Process 100 continues reconciling, by the binary translator using the compiler-produced metadata, original compiler-produced control flow information with how lower-level machine instructions comprise a control flow in the raw binary code (step 115). Process 100 continues further, reconciling, by the binary translator using the compiler-produced metadata, original compiler-produced aliasing information with how lower-level machine instructions access the memory locations described by the aliasing information according to predetermined criteria (step 120). The predetermined criteria ensure a result of reconciliation is conservative meaning when the analysis is not sure about something then it must choose the safer option, which is usually assuming any two given variables do overlap (that is, they are aliased to each other).

Process 100 continues, preventing, by the binary translator using the compiler-produced metadata, copy propagation of values in temporary variables for decimal computations beyond offsets in the machine instructions where the temporary variables are killed (step 125). Process 100 continues further, generating, by the binary translator, a new compiled program module in a form of an optimized version of the compiled program module having strict compatibility to an original version of the compiled program module (step 130). Process 100 terminates thereafter (step 135).

Figure 2:
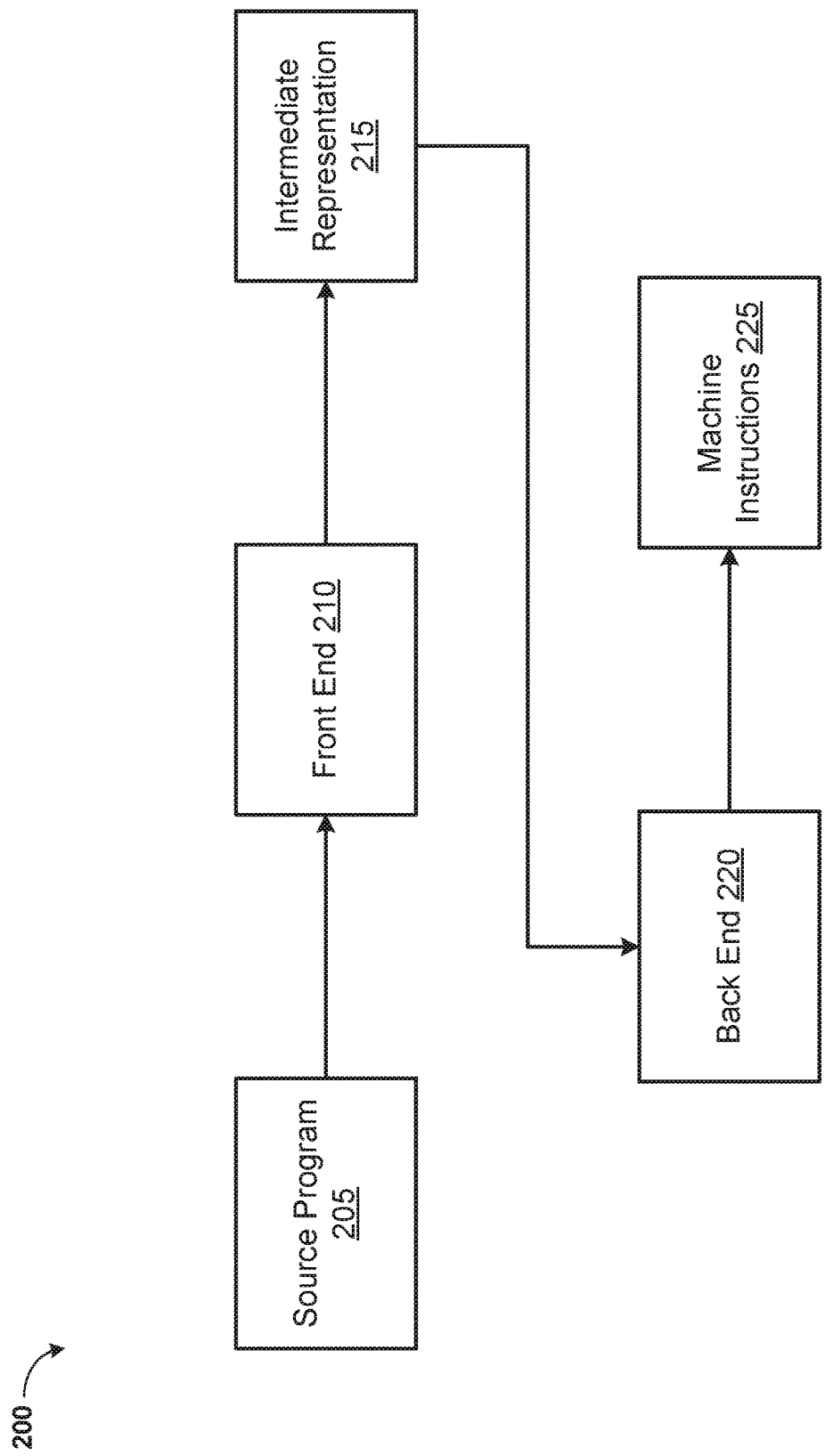
FIG. 2 is a schematic representation of an overview of a compilation process used in one or more embodiments of the disclosure.

FIG. 2 is a schematic representation of an overview of a compilation process used in one or more embodiments of the disclosure. Compilation process 200 begins with source program code 205 as input to a set of operations using a compilation system. Source program code 205 is consumed by front end 210 of the compilation system. A number of analysis techniques may be employed within front end 210 including lexical, syntactical, and semantic analysis. Output of front end 210 is provided in the form of intermediate representation (IR) 215. A format of IR 215 is determined by the compilation system and is dependent upon the tooling used in front end 210 and back end 220 as well as other tools that may consume IR 215. IR 215 is provided as input to back end 220 for use in static analysis and transformation operations including optimization of the intermediate representation and machine code generation. Output of operations occurring using back end 220 is in the form of machine instructions 225.

The simplest unit of control flow in a computer program is a structure referred to as a basic block having a maximal length sequence of straight line, or branch-free, program code. Thus, a basic block is a sequence of operations that always execute together, unless an operation within the sequence raises an operation exception. Program control always enters the basic block at a first operation and exits that basic block at a last operation of the basic block. The last operation may be one of a branch operation, a jump operation, or a predicated operation.

A control-flow graph (CFG) generated from an intermediate representation IR 215 of computer program code 205, models a flow of control within computer program code 205 between the basic blocks in computer program code 205. As a result, the control-flow graph provides, in graphical form, a representation of possible runtime control-flow paths, or order in which program statements are processed, in computer program code 205. The graph produced of this control flow of computer program code 205 is a directed graph in which each node of the directed graph corresponds to a basic block of the computer program. Each edge of this control-flow graph corresponds to a possible transfer of control from one basic block to another basic block.

The following examples of this disclosure describe methods and techniques for binary optimization which combines the analysis of the raw binary code with extra compiler inserted metadata to achieve both strict compatibility to the original program, even in the presence of errors in the data or original source code, while also enabling high performing binary translated code to be generated. This additional compiler inserted metadata, referred to as descriptive binary data in this disclosure, includes information about the control-flow graph, the alias graph, and the kill points of variables as well as tagging certain instructions and referenced memory locations with higher level information derived from the source of the original program. The descriptive binary metadata includes other forms of data comprising a meaning of certain compiler hardcoded registers, for example, Register X points to the start of static storage, Register Y points to the start of the literal pool; linkage/application binary interface (ABI) info for calls including call return types, flagging of particular "unique" type of calls, for example, calls that do not return, calls having nonstandard control flow, indirect calls; and annotating references to storage in the original raw binary code with information on corresponding type properties, including for example, symbols marked as volatile, user symbols, static symbols, and compiler created temporary symbols. Therefore, by using the descriptive binary data in combination with the raw binary code a binary translator can produce very high performing code that also has strict compatibility to the original compiled program.

Figure 3:
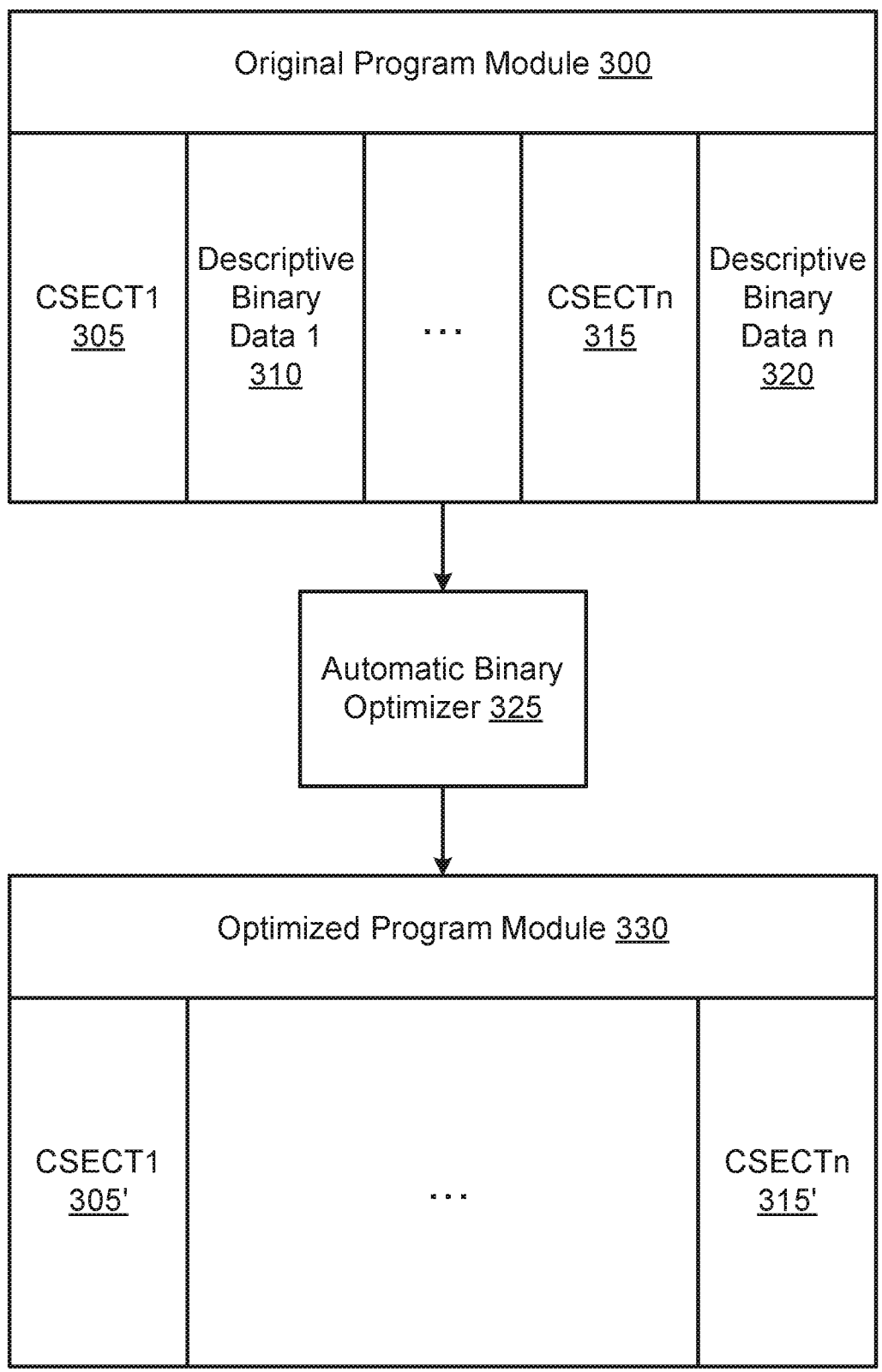
FIG. 3 is a schematic representation of an overview of an optimization process for a compiled program module in one or more embodiments of the disclosure.

FIG. 3 is a schematic representation of an overview of an optimization process for a compiled program module in one or more embodiments of the disclosure. Compiled program module 300 is a construct resulting from the compilation of program source code using a compiler to produce one or more control sections in the form of CSECT1 305 through CSECTn 315. Furthermore, the module includes a particular instance of descriptive binary data 310 corresponding to a respective control section CSECT1 305 and different instance of descriptive binary data 320, corresponding to a respective control section CSECTn 315. The descriptive binary data is used during processing by automatic binary optimizer 325. In one or more embodiments of the disclosure, a compiler inserts the metadata, referred to as descriptive binary data, during the compilation of the original source code into a compiled module. The descriptive binary data is generated during the compilation including: basic blocks in the original intermediate representation (IR) with the start and end original machine instruction offsets corresponding to a respective basic block; edges between these basic blocks in the original IR, for example, which blocks can reach a given block, either as an entry or an exit to the given block; any out-of-line basic blocks for late created control flow, for example, a control flow that is not present in the original IR but is inserted later by the compiler code generation phase; and information available to the original compiler on calls which never return. This descriptive binary data is used to simplify the control flow and subsequent analysis by not creating edges and extra basic blocks where they are not required.

ABO 325 is a specialized application comprising input processing, optimization processing and output processing components. The various components of ABO 325 consume the data comprising the respective control sections and corresponding descriptive binary data to create optimized program module 330. Optimized program module 330 is an executable portion of program code comprising the one or more optimized versions of original control sections CSECT1 305 through CSECTn 315 now shown as optimized control sections CSECT1 305' through CSECTn 315'.

Figure 4:
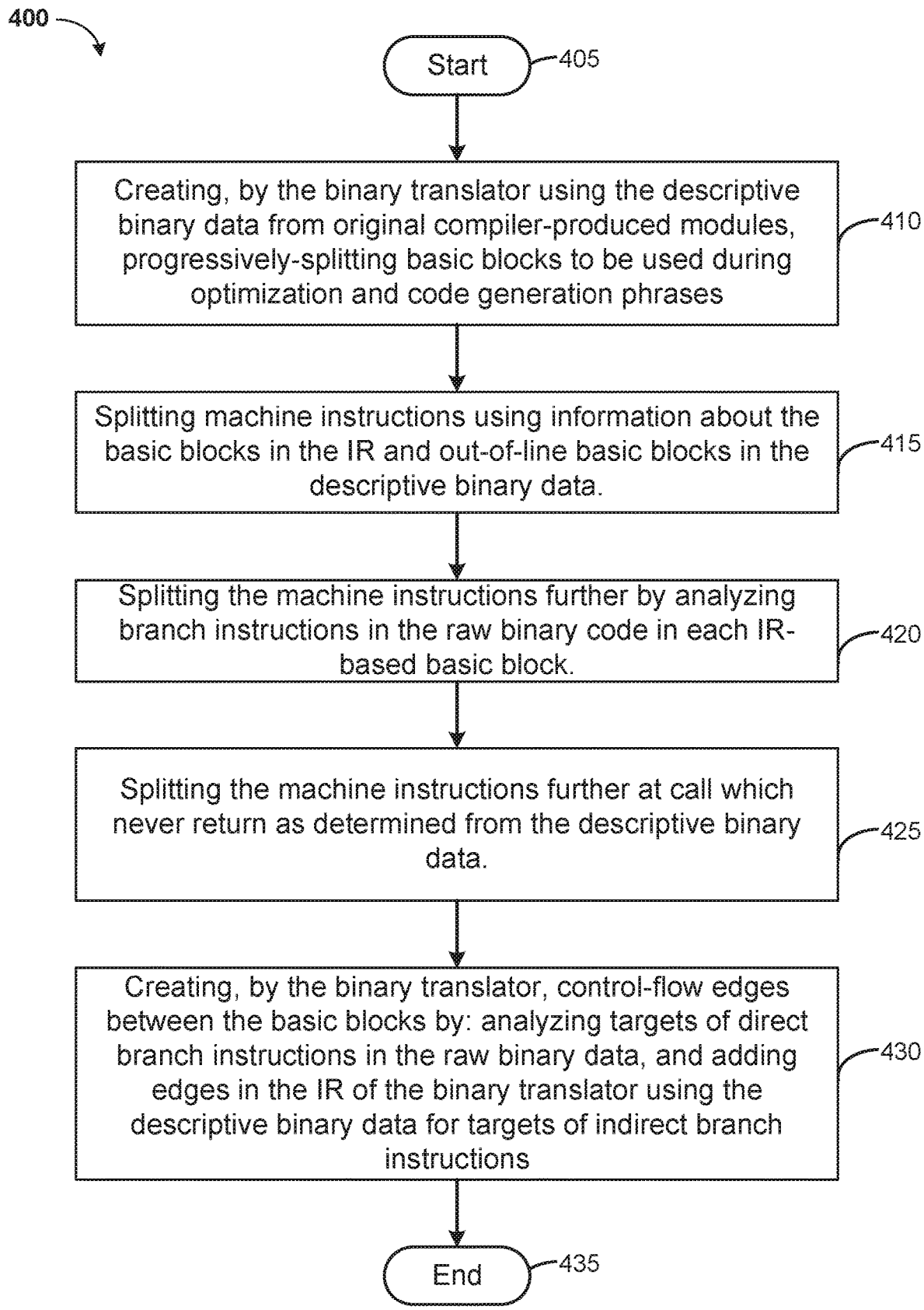
FIG. 4 is a flow diagram of an overview of a reconciliation process for a compiled program module in one or more embodiments of the disclosure.

The following are example processes describing how the compiler inserted metadata is used in conjunction with the raw binary data, specifically executable machine instruction encodings. FIG. 4 is a flow diagram of an overview of a reconciliation process for a compiled program module in one or more embodiments of the disclosure. A first example is with reference to process 400 involving a control flow graph.

Process 400 begins at step 405 creating, by the binary translator using the descriptive binary data from the original compiler-produced modules progressively splitting basic blocks to be used during its own optimization and code generation phases (step 410). Process 400 continues splitting the machine instructions using the information about the basic blocks in the IR and out-of-line basic blocks in the descriptive binary data (step 415). Process 400 continues splitting the machine instructions still further by analyzing the branch instructions in the raw binary data in each of the IR-based basic blocks (step 420). Process 400 continues splitting the machine instructions still further at calls which never return as determined, using the descriptive binary data (step 425).

Control-flow edges between the basic blocks are created by the binary translator (step 430) by analyzing targets of direct branch instructions in the raw binary data; and adding edges in the IR of the binary translator from the descriptive binary data for targets of the indirect branch instructions. Process 400 terminates (step 435).

Process 400 just described, reconciles original compiler-produced control flow information with how lower-level machine instructions comprise the control flow in the binary code. In previous solutions without benefit of the descriptive binary data of this disclosure only the machine instructions could be analyzed to discover control flow. This previous practice typically leads to a very conservative and over constrained control flow graph and depending on the complexity of control flow in the original binary code it may not be possible to derive a conservatively correct control flow graph. Furthermore, in previous solutions analysis complexity and time taken in discovering control flow from raw binary code may also be prohibitive.

Figure 5:
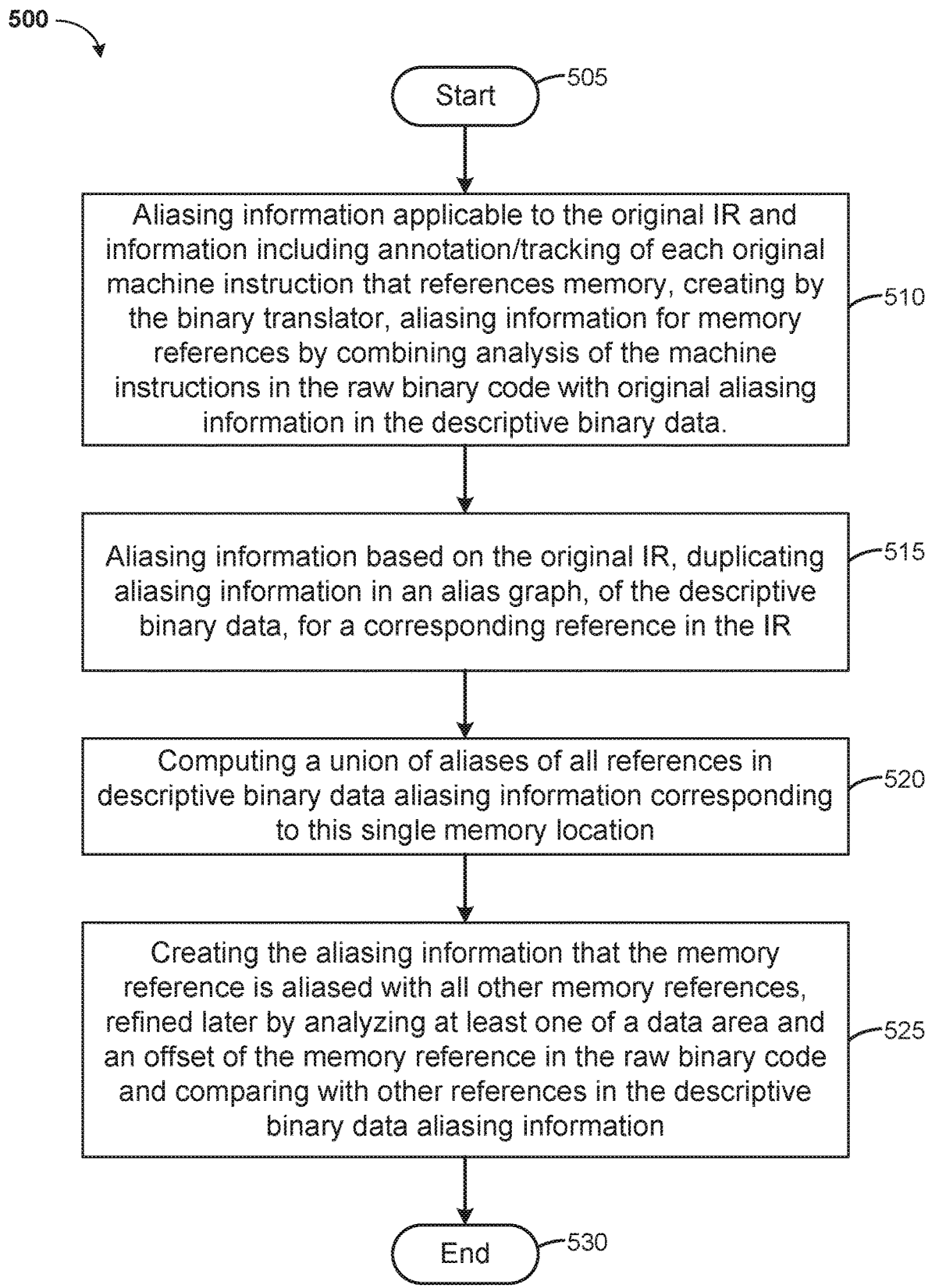
FIG. 5 is a flow diagram of an overview of another reconciliation process for a compiled program module in one or more embodiments of the disclosure.

FIG. 5 is a flow diagram of an overview of another reconciliation process for a compiled program module in one or more embodiments of the disclosure. Process 500 is an example of one or more embodiments of the disclosure with reference to a process involving aliasing. Similar to the previous example regarding process 400, a compiler inserts the descriptive binary data during the compilation of the original source code into the compiled module. Process 500 begins (step 505), and in response to receiving the descriptive binary data further comprising aliasing information applicable to the original IR, which may be in a form of an "alias graph" describing aliasing relationships between each pair of symbolic references in the original complied programs, and annotation/tracking of each original machine instruction that references memory further includes creating by the binary translator aliasing information for memory references by combining an analysis of the machine instructions in the raw binary data with the original aliasing information in the descriptive binary data (step 510).

Process 500 continues in response to a determination a memory reference on an original machine instruction being processed by the binary translator is the same as, or a part of, a reference in descriptive binary data aliasing information based on the original IR, duplicating the aliasing information created in the descriptive binary data alias graph for the corresponding reference in the IR (step 515). Process 500 in response to a determination a memory reference consists of multiple references present in the descriptive binary data aliasing information, for example, when a binary translator combines sequential memory references into a single memory reference, further computing a union of aliases of all references in descriptive binary data aliasing information that correspond to this single memory location (step 520).

Process 500 in response to a determination a memory reference does not have the corresponding reference in the IR, for example, when a compiler created late temporary areas during generation of the machine instructions from the IR, further creating the aliasing information that the memory reference is aliased with all other memory references, later refined through analyzing the data area and/or the offset of the memory reference in the raw binary data and comparing to other references in the descriptive binary data aliasing information (step 525). Process 500 terminates thereafter (step 530).

The aliasing of process 500, in the above example, reconciles original compiler-produced aliasing information with how lower-level machine instructions access the memory locations described by the aliasing without being overly conservative. In previous solutions, without benefit of the descriptive binary data of this disclosure, only the machine instructions could be analyzed to discover aliasing relationships. Therefore, previous solutions typically lead to very conservative aliasing. In a worst case the binary translator would consider every instruction that references memory as potentially conflicting with every other memory reference. The analysis complexity and time of discovering even these very conservative aliasing relationships from raw binary code may also be prohibitive. As a result, aliasing that is too conservative would typically greatly impact the quality of optimization.

Figure 6:
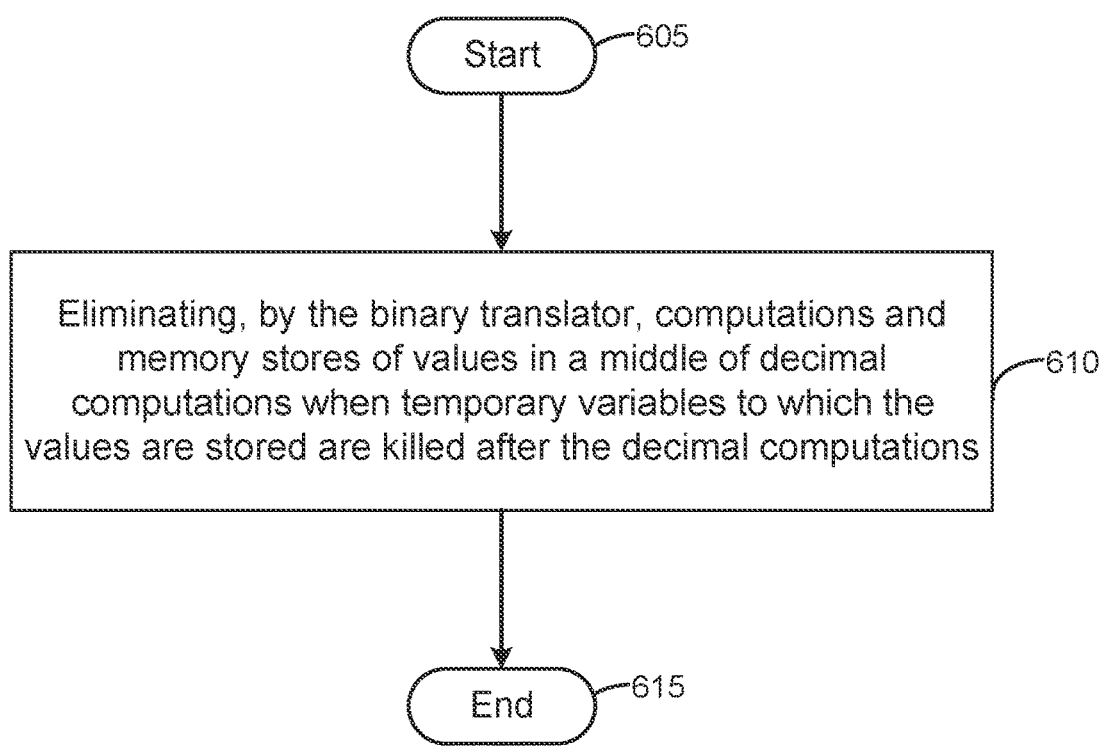
FIG. 6 is a flow diagram of an overview of another reconciliation process for a compiled program module in one or more embodiments of the disclosure.

FIG. 6 is a flow diagram of an overview of another reconciliation process for a compiled program module in one or more embodiments of the disclosure. Process 600 is an example process involving variable "kill points." As in previous examples of process 400 and process 500 a compiler inserts the descriptive binary data during the compilation of the original source code into the compiled module. However, with regard to process 600, the descriptive binary data further including offsets, (i.e., location), of the machine instructions where the temporary variables for decimal computations are killed. This information is also helpful in identification and removal of dead stores to variables. A dead store may be defined as an instruction or operation that assigns a value to a variable, but where it can be proven by a binary translator, compiler, or other similar tool that both the value of the variable is later not used in any subsequent instruction, and that the store is free of side effects, such as exceptions, that would have to be preserved for program correctness. The store or assignment operation in these cases is "dead" and therefore no instruction(s) need to be generated in the binary translated/optimized program module for these original store or assignment operations.

Process 600 begins (step 605) providing a capability of a binary translator to prevent copy propagation of the values in the temporary variables for decimal computations beyond the offsets in the machine instructions where the temporary variables are killed. Process 600 includes operations for eliminating, by the binary translator, computations, and stores to memory of values in a middle of decimal computations when temporary variables to which the values are stored are killed after the decimal computations (step 610). As a result, this process provides a capability to provide and consume very accurate live ranges of original compiler-produced temporary memory locations. Process 600 terminates (step 615).

In previous solutions, without benefit of the descriptive binary data, the binary translator would have to assume much larger live ranges of original compiler-produced temporary memory locations. In a worst case this live range would extend to the end of the program. To use more efficient machine instructions, for example, replacing older storage-storage instructions with newer and more efficient register-based instructions, requires removing stores to original compiler-produced locations, otherwise, such optimizations would typically be less effective because the exact manner in which the original store instructions update memory with new or changed values must be precisely maintained in the binary translated/optimized program.

Figure 7:
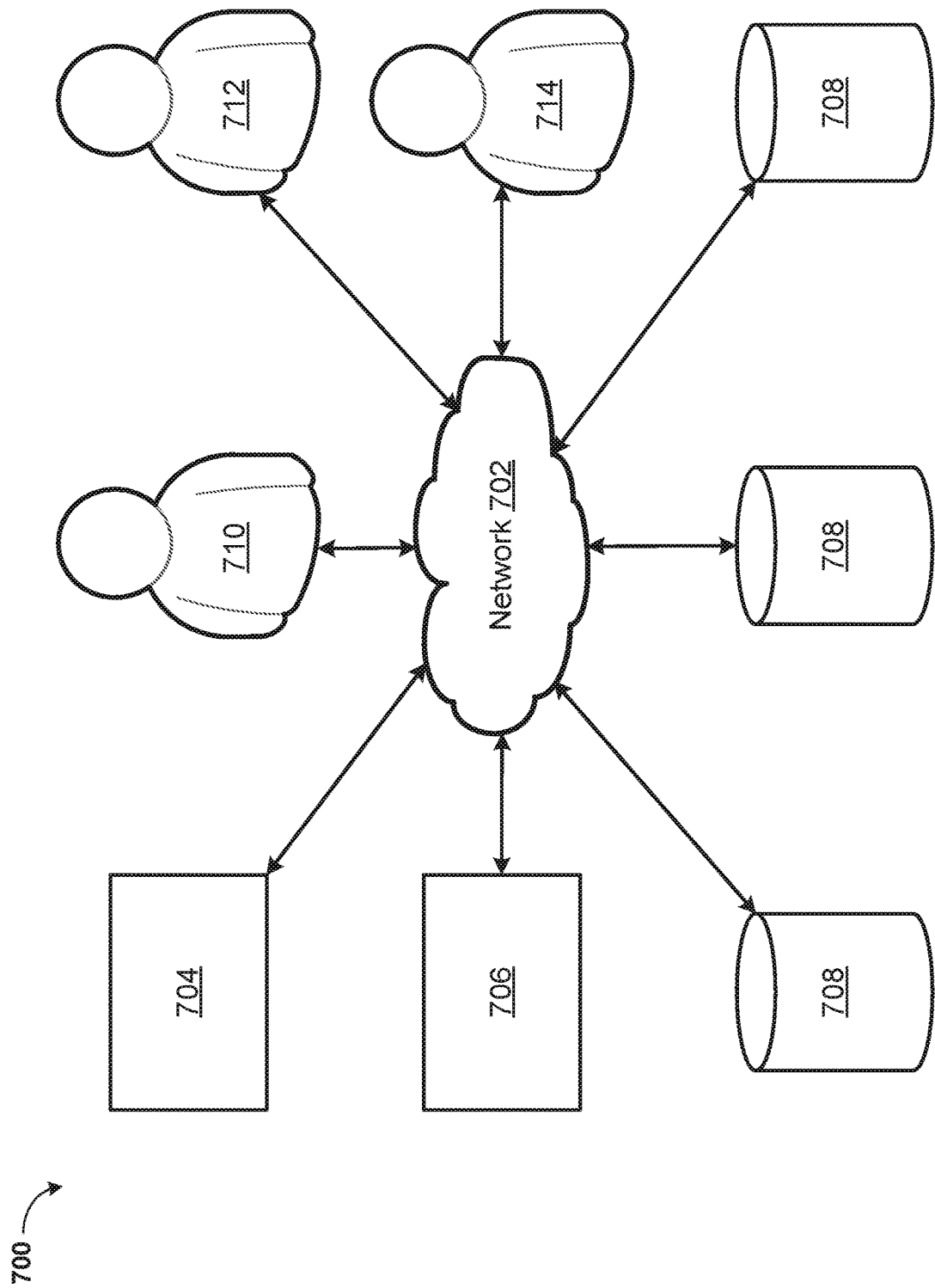
FIG. 7 is a block diagram of a network data processing system operable for various embodiments of the disclosure.
Figure 8:
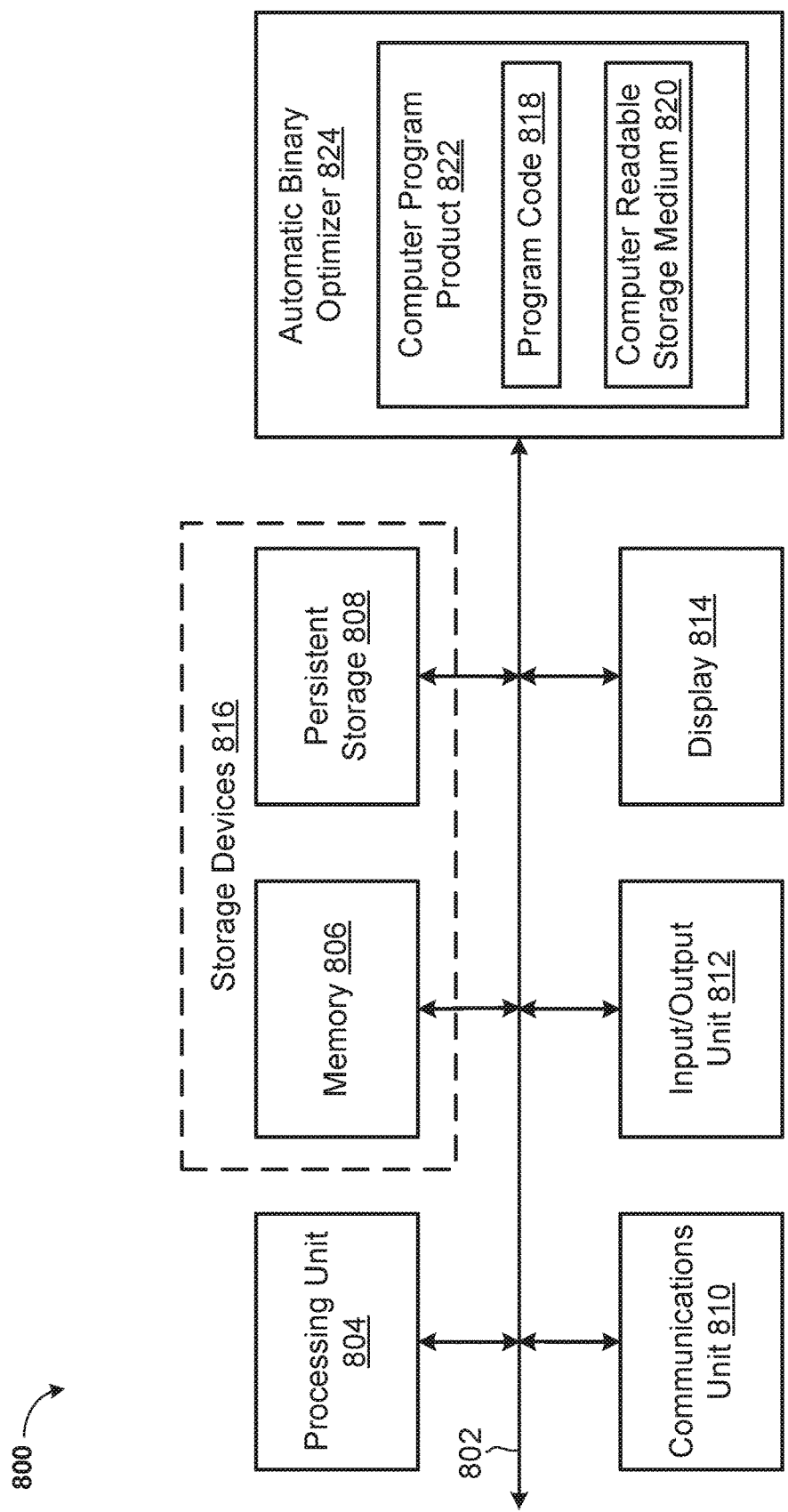
FIG. 8 is a block diagram of a data processing system in the network data processing system of FIG. 7 operable for various embodiments of the disclosure.

With reference now to FIGS. 7 and 8 these figures are only exemplary and are not intended to assert or imply any limitation with regard to the environments in which different embodiments may be implemented. Many modifications to the depicted environments may be made.

FIG. 7 is a pictorial representation of a network of data processing systems in which illustrative embodiments of the disclosure may be implemented. Network data processing system 700 is a network of computers in which the illustrative embodiments may be implemented. Network data processing system 700 contains network 702, which is the medium used to provide communications links between various devices and computers connected together within network data processing system 700. Network 702 may include connections, such as wire, wireless communication links, or fiber optic cables.

In the depicted example, server 704 and server 706 connect to network 702 along with storage unit 708. In addition, clients 710, 712, and 714 connect to network 702. Clients 710, 712, and 714 may be, for example, personal computers or network computers. In the depicted example, server 704 provides data, such as boot files, operating system images, and applications to clients 710, 712, and 714. Clients 710, 712, and 714 are clients to server 704 in this example. In addition, automatic binary optimizer 325 and descriptive binary data 1 310 through descriptive binary data n 320 all of FIG. 3, may also be directly accessed from any of storage unit 708 using network 702. Network data processing system 700 may include additional servers, clients, and other devices not shown.

In the depicted example, network data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, governmental, educational, and other computer systems that route data and messages. Of course, network data processing system 700 also may be implemented as a number of different types of networks, for example, an intranet, a local area network (LAN), or a wide area network (WAN). FIG. 7 is intended as an example, and not as an architectural limitation for the different illustrative embodiments.

With reference to FIG. 8 a block diagram of an exemplary data processing system operable for various embodiments of the disclosure is presented. In this illustrative example, data processing system 800 includes communications fabric 802, which provides communications between processor unit 804, memory 806, persistent storage 808, communications unit 810, input/output (I/O) unit 812, display 814 and automatic binary optimizer 824. Automatic binary optimizer 824 is a variant of automatic binary optimizer 325 of FIG. 3.

Processor unit 804 serves to execute instructions for software that may be loaded into memory 806. Processor unit 804 may be a set of one or more processors or may be a multi-processor core, depending on the particular implementation. Further, processor unit 804 may be implemented using one or more heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example without limitation, data, program code in functional form, and/or other suitable information either on a temporary basis and/or a permanent basis. Memory 806, in these examples, may be, for example, a random-access memory or any other suitable volatile or non-volatile storage device. Persistent storage 808 may take various forms depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. In another example, automatic binary optimizer 824, may also be contained within memory 806 or persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user using a graphical user interface or a nongraphical interface.

Instructions for the operating system, applications and/or programs may be located in storage devices 816, which are in communication with processor unit 804 through communications fabric 802. In these illustrative examples the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as instructions, program instructions, program code, computer usable program code, or computer readable program code that may be read and executed by a processor in processor unit 804. The program code in the different embodiments may be embodied on different physical or tangible computer readable storage media, such as memory 806 or persistent storage 808.

Program code 818 is located in a functional form on computer readable storage medium 820 that is selectively removable and may be loaded onto or transferred to data processing system 800 for execution by processor unit 804. Program code 818 and computer readable storage media 820 form computer program product 822 in these examples. In one example, computer readable storage medium 820 may be in a tangible form, such as, for example, an optical or magnetic disc that is inserted or placed into a drive or other device that is part of persistent storage 808 for transfer onto a storage device, such as a hard drive that is part of persistent storage 808. In a tangible form, computer readable storage medium 820 also may take the form of a persistent storage, such as a hard drive, a thumb drive, or a flash memory that is connected to data processing system 800. The tangible form of computer readable storage media 820 is also referred to as computer recordable storage media or a computer readable data storage device. In some instances, computer readable storage medium 820 may not be removable. In one example, program code 818 contains program code, which when executed, causes automatic binary optimizer 824 to be fully functional.

Alternatively, program code 818 may be transferred to data processing system 800 from computer readable storage medium 820 through a communications link to communications unit 810 and/or through a connection to input/output unit 812. The communications link and/or the connection may be physical or wireless in the illustrative examples.

In some illustrative embodiments, program code 818 may be downloaded over a network to persistent storage 808 from another device or data processing system for use within data processing system 800. For instance, program code stored in a computer readable data storage device in a server data processing system may be downloaded over a network from the server to data processing system 800. The data processing system providing program code 818 may be a server computer, a client computer, or some other device capable of storing and transmitting program code 818.

Thus, according to one or more embodiments, a computer-implemented method for binary translation, comprising combining, by a binary translator, raw binary code and compiler-produced metadata associated with a compiled program module. Further reconciling, by the binary translator using the compiler-produced metadata, original compiler-produced control flow information with how lower-level machine instructions comprise a control flow in the raw binary code. Reconciling, further by the binary translator using the compiler-produced metadata, original compiler-produced aliasing information with how lower-level machine instructions access the memory locations described by the aliasing information according to predetermined criteria. Still further preventing, by the binary translator using the compiler-produced metadata, copy propagation of values in temporary variables for decimal computations beyond offsets in the machine instructions where the temporary variables are killed. The computer-implemented method further includes removing, by the binary translator using the compiler-produced metadata, identified dead store instructions. The computer-implemented method still further includes generating, by the binary translator, a new compiled program module in a form of an optimized version of the compiled program module having strict compatibility to an original version of the compiled program module.

According to one or more embodiments, a computer-implemented method for binary translation, receiving as input by a binary translator an original compiler-produced module comprising raw binary code that does not have binary metadata and receiving further input by the binary translator a separate compiler-produced metadata in one of a binary form and a text form. The computer-implemented method further includes combining, by the binary translator, the raw binary code and the compiler-produced metadata in at least one of a physical form and a logical form. The computer-implemented method includes reconciling, by the binary translator using the compiler-produced metadata, original compiler-produced control flow information with how lower-level machine instructions comprise a control flow in the raw binary code. The computer-implemented method includes further reconciling by the binary translator using the compiler-produced metadata, original compiler-produced aliasing information with how lower-level machine instructions access the memory locations described by the aliasing information according to predetermined criteria. The computer-implemented method further includes preventing, by the binary translator using the compiler-produced metadata, copy propagation of values in temporary variables for decimal computations beyond offsets in the machine instructions where the temporary variables are killed. The computer-implemented method includes removing, by the binary translator using the compiler-produced metadata, identified dead store instructions. The computer-implemented method includes generating, by the binary translator, of a new compiled program module in a form of an optimized version of the compiled program module having strict compatibility to an original version of the compiled program module.

According to one or more embodiments, a computer-implemented method for binary translation, receiving as input by a binary translator an original compiler-produced module comprising raw binary code that does not have binary metadata. The computer-implemented method also receiving further input by the binary translator from a repository comprising high level program information corresponding to the original compiler-produced module in compiler-produced metadata information including instruction offset, and reference to storage. The computer-implemented method further includes combining, by the binary translator, the raw binary code and the compiler-produced metadata in at least one of a logical form and a physical form. The computer-implemented method providing a capability of reconciling, by the binary translator using the compiler-produced metadata, original compiler-produced control flow information with how lower-level machine instructions comprise a control flow in the raw binary code. The computer-implemented method further providing a capability of reconciling, by the binary translator using the compiler-produced metadata, original compiler-produced aliasing information with how lower-level machine instructions access the memory locations described by the aliasing information according to predetermined criteria. The computer-implemented method providing a capability of preventing, by the binary translator using the compiler-produced metadata, copy propagation of values in temporary variables for decimal computations beyond offsets in the machine instructions where the temporary variables are killed. The computer-implemented method also providing a capability of removing, by the binary translator using the compiler-produced metadata, identified dead store instructions. The computer-implemented method further includes generating, by the binary translator, of a new compiled program module in a form of an optimized version of the compiled program module having strict compatibility to an original version of the compiled program module.

According to one or more embodiments, a computer-implemented method for binary translation combining raw binary code and compiler-produced metadata, in response to receiving original compiler-produced control flow information including descriptive binary data comprising basic blocks in an original intermediate representation (IR), with start and end original machine instruction offsets corresponding to each respective block, edges between these basic blocks in the original IR, out-of-line basic blocks for late created control flow, and information available to the original compiler on calls which never return, reconciling the original compiler-produced control flow information with how lower level machine instructions make up a control flow in raw binary code by: creating, by a binary translator using the descriptive binary data from original compiler-produced modules, progressively splitting basic blocks to be used during optimization and code generation phases of the binary translator.

The progressively splitting further comprising, splitting machine instructions using information about the basic blocks in the original IR and out-of-line basic blocks in the descriptive binary data; splitting the machine instructions further by analyzing branch instructions in the raw binary code in each IR-based basic block; and splitting the machine instructions further at calls which never return as determined from the descriptive binary data; and creating, by the binary translator control-flow edges between the basic blocks by: analyzing targets of direct branch instructions in the raw binary code, and adding edges in the IR of the binary translator using the descriptive binary data for targets of indirect branch instructions.

The computer-implemented method, in response to receiving the descriptive binary data further comprising aliasing information as it applies to the original IR and information including annotation/tracking of each original machine instruction that references memory, creating, by the binary translator, aliasing information for memory references by combining analysis of the machine instructions in the raw binary code with original aliasing information in the descriptive binary data.

The computer-implemented method, in response to a determination a memory reference on an original machine instruction being processed by the binary translator is at least one of same as, and a part of, a reference in the aliasing information of the descriptive binary based on the original IR, further includes duplicating aliasing information in an alias graph of the descriptive binary data for a corresponding reference in the IR. The computer-implemented method, in response to a determination a memory reference consists of multiple references that are present in the aliasing information of the descriptive binary data, further includes computing a union of aliases of all references in the aliasing information of the descriptive binary data corresponding to this single memory location. The computer-implemented method, in response to a determination the memory reference does not have a corresponding reference in the IR, further includes creating the aliasing information that the memory reference is aliased with all other memory references, refined later by analyzing at least one of a data area and an offset of the memory reference in the raw binary code and comparing with other references in the aliasing information of the descriptive binary data. The computer-implemented method, in response to receiving the descriptive binary data further comprising offsets of the machine instructions where temporary variables for decimal computations are killed, further includes preventing, by the binary translator, copy propagation of values in the temporary variables for decimal computations beyond the offsets in the machine instructions where the temporary variables are killed.

The computer-implemented method further includes eliminating, by the binary translator, computations, and stores to memory of values in a middle of the decimal computations when the temporary variables to which the values are stored are killed after the decimal computations. The computer-implemented method still further includes generating, by the binary translator, of a new compiled program module in a form of an optimized version of the compiled program module having strict compatibility to an original version of the compiled program module.

The descriptions of the various embodiments have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for binary translation, the computer-implemented method comprising:
    combining, by a binary translator, raw binary code and compiler-produced metadata associated with a compiled program module;
    reconciling, by the binary translator using the compiler-produced metadata, original compiler-produced control flow information with how lower-level machine instructions comprise a control flow in the raw binary code;
    reconciling, by the binary translator using the compiler-produced metadata, original compiler-produced aliasing information with how lower-level machine instructions access the memory locations described by the aliasing information according to predetermined criteria;
    preventing, by the binary translator using the compiler-produced metadata, copy propagation of values in temporary variables for decimal computations beyond offsets in the machine instructions where the temporary variables are killed;
    removing, by the binary translator using the compiler-produced metadata, of identified dead store instructions; and
    generating, by the binary translator, a new compiled program module in a form of an optimized version of the compiled program module having strict compatibility to an original version of the compiled program module.

2. The method of claim 1 wherein the compiler-produced metadata further comprising:
    descriptive binary data comprising basic blocks in an original intermediate representation (IR), with the start and end original machine instruction offsets corresponding to each respective block, edges between these basic blocks in the original IR, out-of-line basic blocks for late created control flow, and information available to the original compiler on calls which never return.

3. The method of claim 2 wherein the reconciling, by the binary translator using the compiler-produced metadata, original compiler-produced control flow information with how lower-level machine instructions comprise the control flow in the raw binary code further comprising:
creating, by the binary translator using the descriptive binary data from original compiler-produced modules, progressively splitting basic blocks to be used during optimization and code generation phases by:
splitting machine instructions using information about the basic blocks in the IR and out-of-line basic blocks in the descriptive binary data;
splitting the machine instructions further by analyzing branch instructions in the raw binary code in each IR-based basic block; and
splitting the machine instructions further at calls which never return as determined from the descriptive binary data; and
creating, by the binary translator control-flow edges between the basic blocks by:
analyzing targets of direct branch instructions in the raw binary data, and
adding edges in the IR of the binary translator using the descriptive binary data for targets of indirect branch instructions.

4. The method of claim 2 wherein the reconciling, by the binary translator using the compiler-produced metadata, original compiler-produced aliasing information with how lower-level machine instructions access the memory locations described by the aliasing information according to predetermined criteria, further comprising:
in response to receiving the descriptive binary data further comprising aliasing information applicable to the original IR and information including annotation/tracking of each original machine instruction that references memory, creating by the binary translator, aliasing information for memory references by combining analysis of the machine instructions in the raw binary code with original aliasing information in the descriptive binary data;
in response to a determination a memory reference on an original machine instruction being processed by the binary translator is at least one same as, and a part of, a reference in the descriptive binary data aliasing information based on the original IR, duplicating aliasing information in an alias graph, of the descriptive binary data, for a corresponding reference in the IR;
in response to a determination a memory reference consists of multiple references that are present in the descriptive binary data aliasing information, computing a union of aliases of all references in descriptive binary data aliasing information corresponding to this single memory location; and
in response to a determination the memory reference does not have a corresponding reference in the IR, creating the aliasing information that the memory reference is aliased with all other memory references, refined later by analyzing at least one of a data area and an offset of the memory reference in the raw binary code and comparing with other references in the descriptive binary data aliasing information.

5. The method of claim 2 wherein the preventing, by the binary translator using the compiler-produced metadata, copy propagation of values in temporary variables for decimal computations beyond offsets in the machine instructions where the temporary variables are killed, and removing, by the binary translator using the compiler-produced metadata, of identified dead store instructions, further comprising:

eliminating, by the binary translator, computations, and stores to memory of values in a middle of the decimal computations when the temporary variables to which the values are stored are killed after the decimal computations.

6. The method of claim 1, wherein combining, by a binary translator, raw binary code and compiler-produced metadata associated with a compiled program module comprises:
receiving as input by a binary translator an original compiler-produced module comprising raw binary code that does not have binary metadata;
receiving further input by the binary translator a separate compiler-produced metadata in one of a binary form and a text form;
combining, by the binary translator, the raw binary code and the compiler-produced metadata in at least one of a physical form and a logical form.

7. The method of claim 6, wherein the received further input comprises high level program information corresponding to the original compiler-produced module in compiler-produced metadata information including instruction offset, and reference to storage.

8. A system for binary translation, the system comprising:
a bus;
a memory connected to the bus, having computer executable instructions stored thereon; and
one or more processors connected to the bus, wherein at least one of the one or more processors executes the computer executable instructions of a method comprising:
combining, by a binary translator, raw binary code and compiler-produced metadata associated with a compiled program module;
reconciling, by the binary translator using the compiler-produced metadata, original compiler-produced control flow information with how lower-level machine instructions comprise a control flow in the raw binary code;
reconciling, by the binary translator using the compiler-produced metadata, original compiler-produced aliasing information with how lower-level machine instructions access the memory locations described by the aliasing information according to predetermined criteria;
preventing, by the binary translator using the compiler-produced metadata, copy propagation of values in temporary variables for decimal computations beyond offsets in the machine instructions where the temporary variables are killed;
removing, by the binary translator using the compiler-produced metadata, of identified dead store instructions; and
generating, by the binary translator, a new compiled program module in a form of an optimized version of the compiled program module having strict compatibility to an original version of the compiled program module.

9. The system of claim 8, wherein the compiler-produced metadata further comprising:
descriptive binary data comprising basic blocks in an original intermediate representation (IR), with the start and end original machine instruction offsets corresponding to each respective block, edges between these basic blocks in the original IR, out-of-line basic blocks for late created control flow, and information available to the original compiler on calls which never return.

10. The system of claim 9, wherein the reconciling, by the binary translator using the compiler-produced metadata, original compiler-produced control flow information with how lower-level machine instructions comprise the control flow in the raw binary code further comprising:

creating, by the binary translator using the descriptive binary data from original compiler-produced modules, progressively splitting basic blocks to be used during optimization and code generation phases by:
- splitting machine instructions using information about the basic blocks in the IR and out-of-line basic blocks in the descriptive binary data;
- splitting the machine instructions further by analyzing branch instructions in the raw binary code in each IR-based basic block; and
- splitting the machine instructions further at calls which never return as determined from the descriptive binary data; and
- creating, by the binary translator control-flow edges between the basic blocks by:
  - analyzing targets of direct branch instructions in the raw binary data, and
  - adding edges in the IR of the binary translator using the descriptive binary data for targets of indirect branch instructions.

11. The system of claim 9, wherein the reconciling, by the binary translator using the compiler-produced metadata, original compiler-produced aliasing information with how lower-level machine instructions access the memory locations described by the aliasing information according to predetermined criteria, further comprising:

in response to receiving the descriptive binary data further comprising aliasing information applicable to the original IR and information including annotation/tracking of each original machine instruction that references memory, creating by the binary translator, aliasing information for memory references by combining analysis of the machine instructions in the raw binary code with original aliasing information in the descriptive binary data;

in response to a determination a memory reference on an original machine instruction being processed by the binary translator is at least one same as, and a part of, a reference in the descriptive binary data aliasing information based on the original IR, duplicating aliasing information in an alias graph, of the descriptive binary data, for a corresponding reference in the IR;

in response to a determination a memory reference consists of multiple references that are present in the descriptive binary data aliasing information, computing a union of aliases of all references in descriptive binary data aliasing information corresponding to this single memory location; and in response to a determination the memory reference does not have a corresponding reference in the IR, creating the aliasing information that the memory reference is aliased with all other memory references, refined later by analyzing at least one of a data area and an offset of the memory reference in the raw binary code and comparing with other references in the descriptive binary data aliasing information.

12. The system of claim 9, wherein the preventing, by the binary translator using the compiler-produced metadata, copy propagation of values in temporary variables for decimal computations beyond offsets in the machine instructions where the temporary variables are killed, and removing, by the binary translator using the compiler-produced metadata, of identified dead store instructions, further comprising:

eliminating, by the binary translator, computations, and stores to memory of values in a middle of the decimal computations when the temporary variables to which the values are stored are killed after the decimal computations.

13. A computer program product comprising a non-transitory computer readable storage medium having computer readable program instructions for binary translation thereon for causing a processor to perform a method comprising:

combining, by a binary translator, raw binary code and compiler-produced metadata associated with a compiled program module;

reconciling, by the binary translator using the compiler-produced metadata, original compiler-produced control flow information with how lower-level machine instructions comprise a control flow in the raw binary code;

reconciling, by the binary translator using the compiler-produced metadata, original compiler-produced aliasing information with how lower-level machine instructions access the memory locations described by the aliasing information according to predetermined criteria;

preventing, by the binary translator using the compiler-produced metadata, copy propagation of values in temporary variables for decimal computations beyond offsets in the machine instructions where the temporary variables are killed;

removing, by the binary translator using the compiler-produced metadata, of identified dead store instructions; and generating, by the binary translator, a new compiled program module in a form of an optimized version of the compiled program module having strict compatibility to an original version of the compiled program module.

14. The computer program product of claim 13, wherein the compiler-produced metadata further comprising:

descriptive binary data comprising basic blocks in an original intermediate representation (IR), with the start and end original machine instruction offsets corresponding to each respective block, edges between these basic blocks in the original IR, out-of-line basic blocks for late created control flow, and information available to the original compiler on calls which never return.

15. The computer program product of claim 14, wherein the reconciling, by the binary translator using the compiler-produced metadata, original compiler-produced control flow information with how lower-level machine instructions comprise the control flow in the raw binary code further comprising:

creating, by the binary translator using the descriptive binary data from original compiler-produced modules, progressively splitting basic blocks to be used during optimization and code generation phases by:
- splitting machine instructions using information about the basic blocks in the IR and out-of-line basic blocks in the descriptive binary data;
- splitting the machine instructions further by analyzing branch instructions in the raw binary code in each IR-based basic block; and
- splitting the machine instructions further at calls which never return as determined from the descriptive binary data; and creating, by the binary translator control-flow edges
between the basic blocks by:
analyzing targets of direct branch instructions in the
raw binary data, and
adding edges in the IR of the binary translator using
the descriptive binary data for targets of indirect
branch instructions.

16. The computer program product of claim 14, wherein the reconciling, by the binary translator using the compiler-produced metadata, original compiler-produced aliasing information with how lower-level machine instructions access the memory locations described by the aliasing information according to predetermined criteria, further comprising:

in response to receiving the descriptive binary data further comprising aliasing information applicable to the original IR and information including annotation/tracking of each original machine instruction that references memory, creating by the binary translator, aliasing information for memory references by combining analysis of the machine instructions in the raw binary code with original aliasing information in the descriptive binary data;

in response to a determination a memory reference on an original machine instruction being processed by the binary translator is at least one same as, and a part of, a reference in the descriptive binary data aliasing information based on the original IR, duplicating aliasing information in an alias graph, of the descriptive binary data, for a corresponding reference in the IR;

in response to a determination a memory reference consists of multiple references that are present in the descriptive binary data aliasing information, computing a union of aliases of all references in descriptive binary data aliasing information corresponding to this single memory location; and in response to a determination the memory reference does not have a corresponding reference in the IR, creating the aliasing information that the memory reference is aliased with all other memory references, refined later by analyzing at least one of a data area and an offset of the memory reference in the raw binary code and comparing with other references in the descriptive binary data aliasing information.

17. The computer program product of claim 14, wherein the preventing, by the binary translator using the compiler-produced metadata, copy propagation of values in temporary variables for decimal computations beyond offsets in the machine instructions where the temporary variables are killed, and removing, by the binary translator using the compiler-produced metadata, of identified dead store instructions, further comprising:

eliminating, by the binary translator, computations, and stores to memory of values in a middle of the decimal computations when the temporary variables to which the values are stored are killed after the decimal computations.

18. A computer-implemented method for binary translation combining raw binary code and compiler-produced metadata, the computer-implemented method comprising:

in response to receiving original compiler-produced control flow information including descriptive binary data comprising basic blocks in an original intermediate representation (IR), with start and end original machine instruction offsets corresponding to each respective block, edges between these basic blocks in the original IR, out-of-line basic blocks for late created control flow, and information available to the original compiler on calls which never return, reconciling the original compiler-produced control flow information with how lower level machine instructions make up a control flow in raw binary code by:

creating, by a binary translator using the descriptive binary data from original compiler-produced modules, progressively splitting basic blocks to be used during optimization and code generation phases of the binary translator by:

splitting machine instructions using information about the basic blocks in the original IR and out-of-line basic blocks in the descriptive binary data;

splitting the machine instructions further by analyzing branch instructions in the raw binary code in each IR-based basic block; and splitting the machine instructions further at calls which never return as determined from the descriptive binary data; and creating, by the binary translator control-flow edges between the basic blocks by:
analyzing targets of direct branch instructions in the raw binary code, and
adding edges in the IR of the binary translator using the descriptive binary data for targets of indirect branch instructions;

in response to receiving the descriptive binary data further comprising aliasing information as it applies to the original IR and information including annotation/tracking of each original machine instruction that references memory, creating by the binary translator, aliasing information for memory references by combining analysis of the machine instructions in the raw binary code with original aliasing information in the descriptive binary data;

in response to a determination a memory reference on an original machine instruction being processed by the binary translator is at least one of same as, and a part of, a reference in the aliasing information of the descriptive binary based on the original IR, duplicating aliasing information in an alias graph of the descriptive binary data for a corresponding reference in the IR;

in response to a determination a memory reference consists of multiple references that are present in the aliasing information of the descriptive binary data, computing a union of aliases of all references in the aliasing information of the descriptive binary data corresponding to this single memory location; and in response to a determination the memory reference does not have a corresponding reference in the IR, creating the aliasing information that the memory reference is aliased with all other memory references, refined later by analyzing at least one of a data area and an offset of the memory reference in the raw binary code and comparing with other references in the aliasing information of the descriptive binary data;

in response to receiving the descriptive binary data further comprising offsets of the machine instructions where temporary variables for decimal computations are killed, preventing, by the binary translator, copy propagation of values in the temporary variables for decimal computations beyond the offsets in the machine instructions where the temporary variables are killed;

eliminating, by the binary translator, computations, and stores to memory of values in a middle of the decimal computations when the temporary variables to which the values are stored are killed after the decimal computations; and, generating, by the binary translator, a new compiled program module in a form of an optimized version of the compiled program module having strict compatibility to an original version of the compiled program module.

19. The computer-implemented method of claim 18, wherein the compiler-produced metadata further comprising:

descriptive binary data comprising basic blocks in an original intermediate representation (IR), with the start and end original machine instruction offsets corresponding to each respective block, edges between these basic blocks in the original IR, out-of-line basic blocks for late created control flow, and information available to the original compiler on calls which never return.

20. A computer-implemented method for binary translation, the computer-implemented method comprising:

receiving as input by a tool an original compiler-produced module comprising raw binary code that does not have binary metadata;

receiving further input by the tool a separate compiler-produced metadata in one of a binary form and a text form;

combining by the tool the original compiler-produced module with the separate compiler-produced metadata to create a new module containing the compiler-produced metadata in the one of the binary form;

passing the new module to a binary translator;

reconciling, by the binary translator using the new module with compiler-produced metadata, original compiler-produced control flow information with how lower-level machine instructions comprise a control flow in the raw binary code;

reconciling, by the binary translator using the new module with the compiler-produced metadata, original compiler-produced aliasing information with how lower-level machine instructions access the memory locations described by the aliasing information according to predetermined criteria;

preventing, by the binary translator using the new module with the compiler-produced metadata, copy propagation of values in temporary variables for decimal computations beyond offsets in the machine instructions where the temporary variables are killed;

removing, by the binary translator using the compiler-produced metadata, identified dead store instructions; and generating, by the binary translator, optimized version of the new module having strict compatibility to an original version of the compiled program module.

* * * * *